April 4, 1950 A. S. RESLER 2,502,993

DENTAL X-RAY FILM PACKAGE

Filed Oct. 28, 1948

INVENTOR
ALTER S. RESLER
BY
Schainer and Liberman
ATTORNEYS

Patented Apr. 4, 1950

2,502,993

UNITED STATES PATENT OFFICE 2,502,993

DENTAL X-RAY FILM PACKAGE

Alter Siegmund Resler, New York, N. Y.

Application October 28, 1948, Serial No. 56,985

1 Claim. (Cl. 250—69)

The present invention relates generally to dental X-ray film packages, and to the supports therefor during the exposure of the film. The present invention relates to the film packages only to the extent that they are to be provided with a particular treatment rendering same more efficiently usable with, or without, the holders of the invention.

It has always been a serious problem in dental X-ray work to dispose the X-ray film within the patient's mouth so as to be comfortably received and firmly held during the actual exposure time. Many different expedients have been devised to hold the films in place, with more or less success, but the problem still presents itself to a substantial extent. The film packages, in the past, have been equipped with cords to tie them in place, or have had wing portions formed as a part thereof to be held between the patient's teeth. Also, the holders have developed into devices of some complexity, size and bulk. The present invention is directed to a new solution of this problem, combining a special treatment of the ordinary film package with or without the use of a new type of film support.

The main object of the present invention, therefore, is the provision of a new and improved dental X-ray film package having adhering means thereon.

An associated main object of the present invention is the provision of new and improved X-ray film supports.

Another object of the present invention is the provision of a dental X-ray film package one side of which is treated with a tacky material.

Still another object of the present invention is the provision of a dental X-ray film package one side of which is treated with a tacky material and provided with a covering material easily removable from the package without impairing the adhesive properties.

Still another object of the present invention is the provision of a film package with tacky material disposed on the side opposite that to be disposed towards the X-rays.

Still another object of the present invention is the provision of an X-ray film holder or support composed of X-ray permeable, or radiolucent, material, having a base portion and an arm of similar material extending therefrom at right angles thereto, the base being of dimensions slightly smaller than the conventional film package.

Still another object of the present invention is the provision of an X-ray film support composed of X-ray permeable, or radiolucent, material having a generally flat rectangular base portion and an arm extending therefrom at right angles thereto, the arm being shiftable from one side of the base to the other along an edge thereof.

Still other and further objects of the present invention will, in part, be obvious from the following description of illustrative embodiments thereof, and in part pointed out specifically in the following specification.

In the drawings annexed hereto, and forming a part of this specification:

Figure 1:
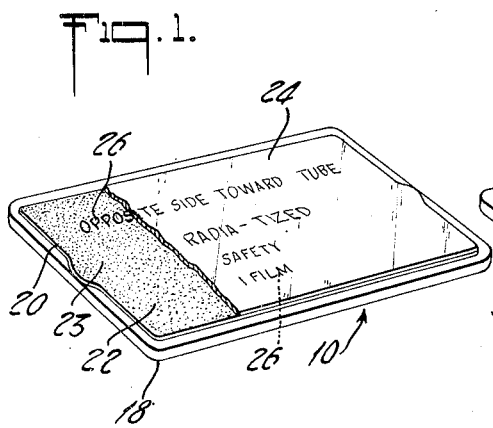
Figure 1 is a perspective view of an X-ray film package treated in accordance with, and embodying, the present invention, with a portion of the cover film broken away.

The film package, of conventional overall size and rectangular shape is indicated generally by reference numeral 10, and consists of a thin, rectangular sheet 12 of sensitized film material, on both sides of which are disposed similarly sized sheets of thin, black paper 14, 14 as is usual in X-ray film packages. A sheet of thin lead foil, as 16, is placed over the sandwich on one side thereof, and the four similarly sized and shaped sheets are disposed within a black lined wrapper sheet 18, which is slightly longer and wider than sheets 12, 14, 16, the ends of which wrapper sheet 18 are folded over against the back of foil sheet 16.

A closure sheet 20, usually of thin paper, is then disposed over the folded ends of sheet 18, and the package sealed by a suitably applied adhesive, disposed between the underside of sheet 20 and foil sheet 16 and the bent-over ends of wrapper 18, in order to make the package light-tight. Up to this point, there has been described the conventional dental X-ray film package, commercially available. In accordance with my invention, as illustrated in Figure 1, the exposed surface 22 of closure sheet 20 is provided with a layer of a tacky material 23, which is then overlaid by a thin sheet or film of transparent material 24, as cellophane or the like. As shown in Figure 1, directions for the positioning of the film package within the mouth are conventionally printed or stamped on sheet, 20 and the tacky material used is preferably transparent so that the instructions, indicated at 26, may be seen and followed therethrough, and also through the protective film or sheet 24.

Figure 2:
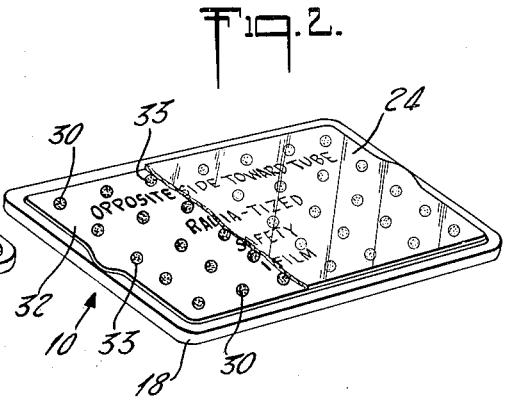
Figure 2 is a perspective view of a modified form of film package also constructed according to and embodying the present invention, with a portion of the protective film broken away.

In the modification of the present invention illustrated in Figure 2, the conventional film package 10 is used, as above described, with but one change in the arrangement of the covering materials over the film sheet 12. In this form, the tacky material indicated at 30 is also used to seal cover sheet 32 to the film assembly (including the film, papers 14, 14 and foil sheet 16), the cover sheet 32 being apertured as at 33 to permit the tacky material to pass therethrough. The same protective film or sheet 24 is provided to overlie the tacky material until the film package is disposed within the patient's mouth. The perforations 33, 33 may be of such small size as not to destroy the legibility of instructions 26. The tacky material used in this modification may be either transparent or opaque.

Figure 3:
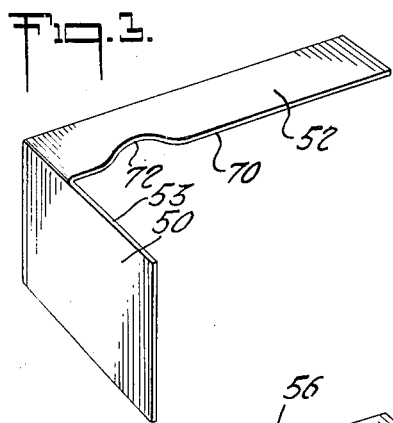
Figure 3, Figure 4 and Figure 5 are, respectively, perspective views of film supports constructed according to and embodying the present invention.
Figure 4:
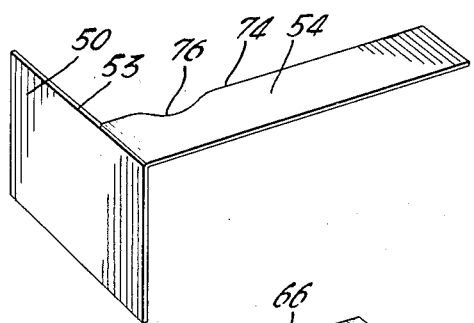
Figure 5:
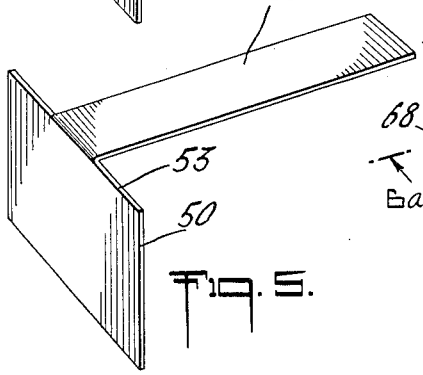

The film supports formed according to my invention, and illustrated in Figures 3, 4 and 5, are formed of very thin section material, preferably radiolucent, so as to permit the passage of Roentgen rays therethrough. Several different types of plastic material, presently commercially available, have been found to be eminently suitable for use in the formation of my holders.

In the form of holder illustrated in Figure 3, a generally rectangular base portion 50 is provided, of size slightly smaller than the conventional dental X-ray film package, and has an integrally formed elongated arm 52 extending outwardly therefrom and at right angles thereto from an edge 53 thereof; this form being well adapted for use when X-ray films are to be exposed of the lower right or upper left portions of the mouth. The film package is disposed against the base 50, the arm 52 being used to properly position the holder within the mouth and then gripped between the patient's teeth.

The form of holder illustrated in Figure 4 comprises a similarly sized base 50, but the integrally formed arm 54 extends outwardly therefrom and at right angles thereto from the same long edge 53 at the opposite end of the base; this form being well adapted for use when films are to be exposed of the lower left and upper right portions of the mouth.

The form of holder illustrated in Figure 5 has the same base portion 50, but the integrally formed arm 56 extends outwardly and at right angles thereto from the same long edge 53 in the center thereof; this form being well adapted for use when X-ray films are to be exposed of the center of the mouth and of the canine and bicuspid areas, upper or lower portions of the mouth. Base 50, in this form, may be slightly less wide than in the forms of Figures 3 and 4.

Figure 6:
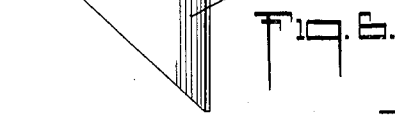
Figure 6 is a perspective view of a modified form of film support also constructed according to and embodying the present invention.
Figure 6A:
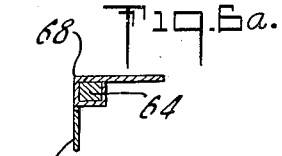
Figure 6a is a section on the line 6a—6a of Figure 6.

The form of support illustrated in Figures 6 and 6a is adapted for universal use over the entire mouth area. A generally rectangular base 60 is provided, one long edge 61 of which is provided with a pair of ear portions 62, 62 at opposite ends thereof. A shaft or rod 64 of rectangular section is provided, the ends of which are secured within ears 62, 62, and are held thereby against rotation with respect thereto. An elongated, narrow arm 66 is provided, the inner end 68 of which is bent or fitted closely about shaft or rod 64, so as to permit arm 66 to slide back and forth along shaft or rod 64 and held in any desired relative position by the close friction fit. It will be obvious that modifications may be resorted to without departing from the spirit of the invention in regard to the shifting of arm 66 with respect to base 60, and my invention is to be limited only by the scope of the annexed claim.

Referring now to Figure 3, it will be seen that the inner edge 70 of arm 52 is cut out as at 72, the cut-out being slightly spaced outwardly from the point of connection with base 50. The provision of cut-out 72 causes an easier and more comfortable fit of arm 52 against the edge of the mouth when the holder is disposed therewithin. In like manner, the inner edge 74 of arm 54 (Figure 4) is cut out as at 76, and for the same reason, both edges of arm 56 are cut away, as at 80, 80 (Figure 5).

Figure 7:
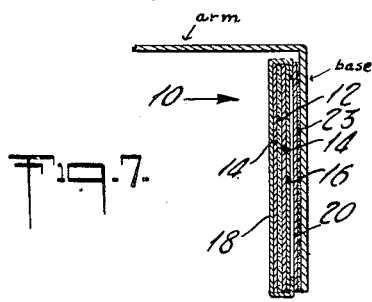
Figure 7 is a sectional view showing the film support according to the present invention and the mounting of my novel film package thereon.

In use, the protective film or sheet 24 is removed from the film package, of Figure 1 and or Figure 2, and the tacky face of the package placed against the inner face of the base portion of the holder (see Figure 7) adhering closely thereto because of the tackiness of material 23. As noted above, the base portions of my holders are preferably smaller than the film package, so that the edges or corners of the film package may be rounded or bent over to avoid irritating the mouth of the patient. After the exposure of the film is complete and the film package removed from the patient's mouth, the transparent film or sheet 24 is replaced over the cover sheet 20, 32, and the film package disposed for subsequent processing. The thickness of the tacky material and of the protective film or sheet 24 is not so great as to present any particular problem in packaging or handling the film package so treated, and the application of the tacky material according to either modification disclosed herein presents no difficulty either mechanically or financially.

The film holders of the present invention are small, thin and light. They can be handled easily and quickly, and their presence in the patient's mouth causes much less annoyance than holders heretofore commercially available. Actually, however, the film packages treated in accordance with my teachings can be used without any supports other than the patient's finger against the tacky surface, which will prevent slippage of the holding finger against the film package.

In the drawings, the relative thicknesses of the parts are exaggerated so as to show constructional details more clearly, it being understood that the film package with the tacky material thereon, and with the protective film, is only slightly thicker than the untreated conventional film packages.

Having now described my invention, what I claim and desire to secure by Letters Patent is:

A dental X-ray film package which is readily and removably securable to a dental film support, the package comprising a sheet of X-ray sensitive material disposed within a light tight covering, having tacky material on the side of the covering opposite the side to be presented to the source of the X-rays, and having a protective sheet overlying the tacky material, which sheet is normally adherent to the tacky material, and readily removable therefrom prior to film exposure without materially affecting the tackiness of the material and readily replaceable thereover to be held by the tacky material after film exposure whereby the exposed film package may thereafter be disposed for subsequent processing with the tacky side being covered against untoward contacts.

ALTER SIEGMUND RESLER.

REFERENCES CITED

The following references are of record in the file of this patent:

UNITED STATES PATENTS

| Number | Name | Date |
|---|---|---|
| 1,346,360 | White | July 13, 1920 |
| 1,453,194 | Shaw | Apr. 24, 1923 |
| 1,467,876 | Raper | Sept. 11, 1923 |
| 1,536,345 | Jones et al. | May 5, 1925 |
| 1,698,795 | Hillman | Jan. 15, 1929 |
| 1,719,106 | Cressler | July 2, 1929 |
| 1,748,490 | Martin | Feb. 25, 1930 |
| 1,974,936 | Vloch | Sept. 25, 1934 |
| 2,049,497 | Gideon | Aug. 4, 1936 |
| 2,277,364 | Herman | Mar. 24, 1942 |